(12) United States Patent
Zollondz et al.

(10) Patent No.: US 8,727,145 B2
(45) Date of Patent: May 20, 2014

(54) LARGE MOBILE CRANE

(75) Inventors: Rüdiger Zollondz, Hornbach (DE); Alfons Weckbecker, Zweibruecken (DE); Fritz-Botho Köster, Rockenhausen (DE); Günter Karp, Herschberg (DE); Hans-Peter Franzen, Walshausen (DE)

(73) Assignee: Terex Cranes Germany GmbH, Zweibruecken (DE)

( * ) Notice: Subject to any disclaimer, the term of this patent is extended or adjusted under 35 U.S.C. 154(b) by 1024 days.

(21) Appl. No.: 12/085,128

(22) PCT Filed: Oct. 12, 2006

(86) PCT No.: PCT/DE2006/001843
§ 371 (c)(1),
(2), (4) Date: May 16, 2008

(87) PCT Pub. No.: WO2007/056969
PCT Pub. Date: May 24, 2007

(65) Prior Publication Data
US 2009/0289495 A1    Nov. 26, 2009

(30) Foreign Application Priority Data

Nov. 17, 2005 (DE) .......................... 10 2005 055 694
Mar. 29, 2006 (DE) .......................... 10 2006 015 307

(51) Int. Cl.
*B66C 23/26* (2006.01)

(52) U.S. Cl.
USPC ........................................ 212/175; 180/9.48

(58) Field of Classification Search
CPC ........ B62D 55/06; B62D 55/07; B62D 55/08; B62D 55/084
USPC ......... 212/175, 294, 223, 232, 233, 245, 255, 212/260, 271, 195; 180/9.48, 9.52, 9.56, 180/9.1; 305/127, 131
See application file for complete search history.

(56) References Cited

U.S. PATENT DOCUMENTS 2,668,738 A * 2/1954 Przybylski .................... 305/154
3,680,720 A   8/1972 Strange
(Continued)

FOREIGN PATENT DOCUMENTS

DE   199 14 195    11/1999
DE   200 20 953     3/2001
(Continued)

OTHER PUBLICATIONS

Search Report dated Jan. 17, 2007 issued for the underlying International PCT Application No. PCT/DE2006/001843.

*Primary Examiner* — Sang Kim
*Assistant Examiner* — Juan Campos, Jr.
(74) *Attorney, Agent, or Firm* — Browdy and Neimark, PLLC

(57) ABSTRACT

The object of the invention is to reduce the amount of investment required for the usage-optimized configuration and installation of large cranes. This object is achieved by a large mobile crane having an undercarriage, a drive unit (16), a revolving superstructure (18), one or more control stations (17), at least two jibs (3), at least one counter-jib (4), at least two lifting arrangements (22) and counterweights arranged separately or on the basic structure, characterized in that the load-bearing parts of the crane (3, 4, 20) and the mobility-specific parts (5, 6, 7) are of modular design and can be supplemented by exchangeable and/or supplementary parts, wherein the structural units (modules) used essentially correspond, or are similar, to existing standard-crane components, and an increase in load-bearing capacity can be achieved by arranging a number of these in the large crane.

11 Claims, 7 Drawing Sheets

(56) References Cited

U.S. PATENT DOCUMENTS

| | | | |
|---|---|---|---|
| 3,700,115 A * | 10/1972 | Johnson et al. | 212/301 |
| 3,820,616 A * | 6/1974 | Juergens | 180/9.48 |
| 3,868,022 A * | 2/1975 | Greenlay et al. | 212/291 |
| 4,103,783 A | 8/1978 | Beduhn et al. | |
| 4,196,816 A | 4/1980 | Dvorsky et al. | |
| 4,243,148 A * | 1/1981 | Lampson | 212/196 |
| 4,278,863 A * | 7/1981 | Myers | 219/73.1 |
| 4,431,074 A * | 2/1984 | Langerud | 180/9.48 |
| 4,614,275 A * | 9/1986 | Zenno | 212/198 |
| 4,729,486 A * | 3/1988 | Petzold et al. | 212/302 |
| 5,018,630 A * | 5/1991 | McGhie | 212/233 |
| 5,598,896 A * | 2/1997 | Haest | 180/9.48 |
| 6,145,610 A * | 11/2000 | Gallignani | 180/9.48 |
| 6,516,961 B1 | 2/2003 | Knecht et al. | |
| 6,588,521 B1 | 7/2003 | Porubcansky et al. | |
| 6,848,522 B2 * | 2/2005 | Moore et al. | 180/9.1 |
| 6,851,494 B2 * | 2/2005 | Harthauser | 180/9.48 |
| 6,962,222 B2 * | 11/2005 | Kirihata | 180/9.46 |
| 7,874,387 B2 * | 1/2011 | Despres | 180/9.21 |
| 7,997,432 B2 * | 8/2011 | Porubcansky et al. | 212/301 |
| 8,348,073 B2 * | 1/2013 | Foust et al. | 212/180 |
| 2003/0136592 A1 * | 7/2003 | Harthauser | 180/9 |
| 2005/0060918 A1 * | 3/2005 | Inaoka et al. | 37/347 |
| 2006/0273057 A1 | 12/2006 | Zollondz et al. | |

FOREIGN PATENT DOCUMENTS

| | | |
|---|---|---|
| DE | 20 2005 017 362 | 2/2006 |
| GB | 2 031 824 | 4/1980 |
| WO | 2005/030632 A * | 4/2005 |
| WO | WO 2005/030632 | 4/2005 |

* cited by examiner

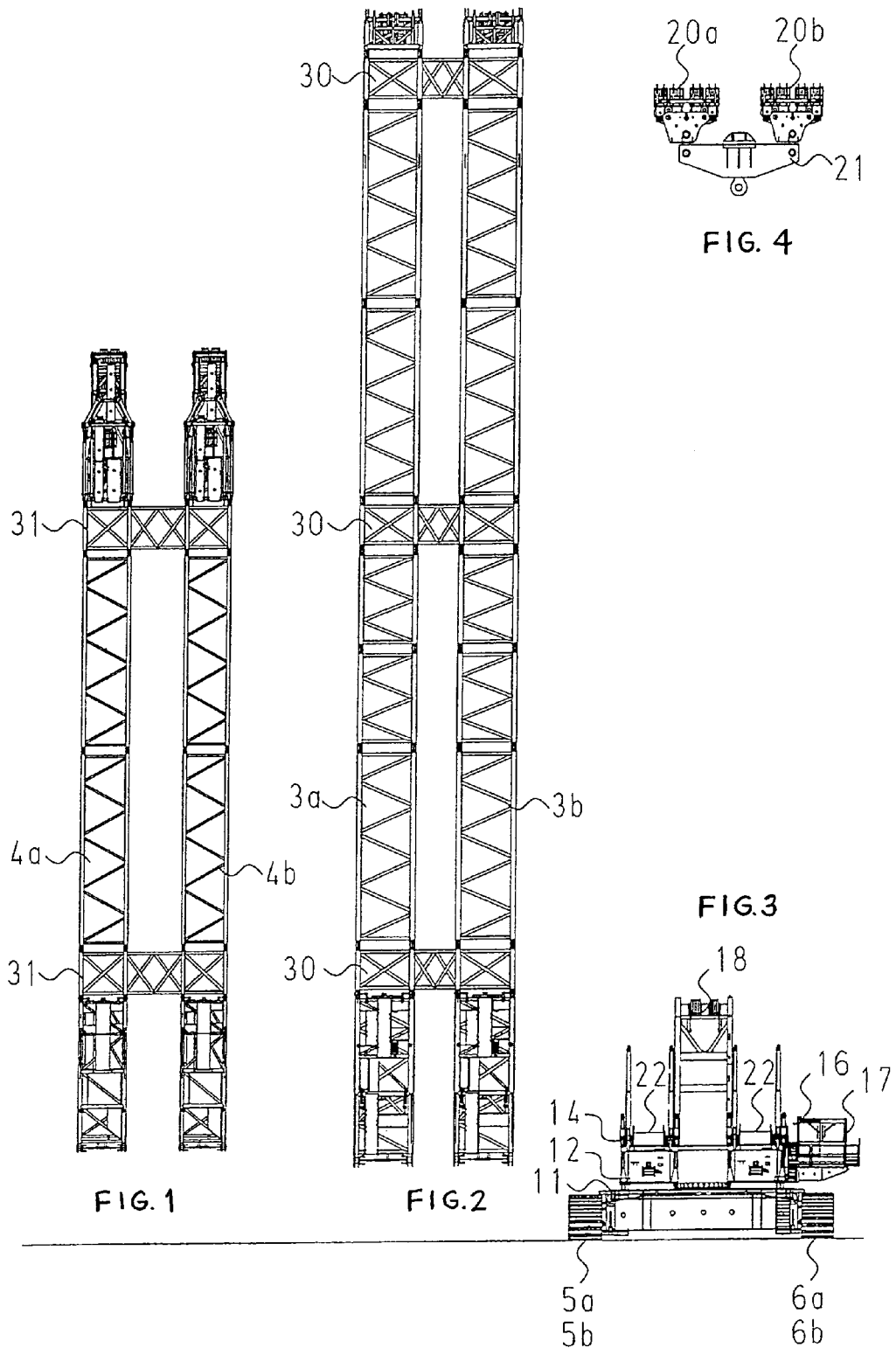

LARGE MOBILE CRANE

CROSS-REFERENCE TO RELATED APPLICATIONS

This is a U.S. national stage of International Application No. PCT/DE2006/001843, filed on 12 Oct. 2006. Priority is claimed on German Application No. 10 2005 055 694.9, filed on 17 Nov. 2005, and German Application No. 10 2006 015 307.3, filed on 29 Mar. 2006.

BACKGROUND OF THE INVENTION

1. Field of the Invention

The invention pertains to a large mobile crane with an undercarriage, a drive unit, a superstructure, one or more control stations, at least two main booms, at least one derrick boom, at least two lifting devices and counterweights, either separate or mounted on the basic machine.

2. Description of the Related Art

Various solutions are known for lifting extremely heavy loads exceeding the capacity of the various current mobile crane designs, large numbers of which are on the market.

It is possible, for example, with the use of the reliable mechanical elements and materials already available for constructing cranes, to build a very large lattice-boom crawler crane whenever desired. As a result of the necessary size of the individual components, however, considerable problems are encountered in the production of the castings in particular, such as the base plates and cable drums as well as the hydraulic components. Although technological limits are reached in some cases, economic limits are reached in all cases, and all of the large cranes thus obtained would include individual pieces difficult to move from one work location to another. The large components present significant problems with respect to transport and handling such as the ability to be driven along ordinary roads and to pass under bridges. An alternative solution, namely, dividing the individual basic components into smaller components, would lead to additional, relatively high costs. Overall, a large machine of this type would be extremely expensive and, as experience has shown, would represent a commercial prototype.

Ring-lift cranes represent a different approach to the lifting of heavy loads. These usually have a large boom or a double-boom system (arranged in parallel or in the shape of an "A"), which are supported on the ground by way of a circular track. In the meantime, several patents have been granted for cranes of this type such as U.S. Pat. No. 4,103,783 and U.S. Pat. No. 4,196,816. The advantage of the ring-lift crane is that much higher load moments can be reached than is possible with crawler cranes. The disadvantage is that ring-lift cranes cannot be moved with a suspended load, and even without a load they can be moved only with considerable effort. In addition, they can make use of only a few components of standard production cranes. They must therefore usually be assembled on site and thus block the progress of the construction work during the tedious assembly and disassembly phases.

So-called derrick cranes are also known. Here a main boom is paired with a derrick boom, the two booms being mounted on the superstructure of a mobile undercarriage or on a stationary foundation.

The extremely large dimensions of all these machines, as previously mentioned, is disadvantageous, because they cause problems during transport and assembly/disassembly. They also suffer from poor lateral stability (especially serious in the case of loads with large surface areas exposed to the wind) because of the unfavorable relationship between the large size of the machine and the short distance between the tracks of the crawler-type carriage

SUMMARY OF THE INVENTION

It is therefore the task of the present invention to eliminate the disadvantages of the known solutions and thus to lower the investment cost for the task-optimized design and installation of large cranes of any desired type and with any desired set of properties.

According to the invention, wherein the components of the crane which absorb the load and the components which provide mobility are designed in modular fashion and can be replaced and supplemented with expansion parts, where the structural units (modules) used essentially correspond to, or resemble, existing standard crane components, and where multiple modules can be combined to form a large crane with a greater working load capacity.

The invention is based on the core idea of creating a mobile crane which is variable, that is, a crane which can be built to suit a specific need. This is accomplished essentially in that, as far as possible, components of existing standard production cranes are used in favorable combinations with expansion parts in a wide variety of ways to achieve large and very large crane configurations.

According to an especially advantageous embodiment, a crane of the derrick type has a double main boom arrangement and a double derrick boom arrangement. The two adjacent booms of a pair are connected to each other preferably so that they are rigid with respect to moments. As a result of this arrangement, the load capacity is significantly increased without limiting the mobility of the basic machine.

Standard components are used as often as possible to build the various configurations of the crane. This applies not only to the load-bearing components but also to the parts which provide the mobility. Thus, for example, through the modular design of the crawler-type carriage or crawler carrier, the footprint can be easily and quickly increased, for which purpose standard components can also be used.

The ability to change the working load possibilities can be improved even more by simplifying the way in which the counterweight being used can be adapted to the load. In other words, it should be possible without major effort to adapt the counterweight to heavier loads as well as to reduce it so that the desired variability can be achieved. This is accomplished by dividing the counterweight into a mobile component and a stationary component. This separation is the object of the modular counterweight carriage disclosed in WO 2007/056970.

So that the invention can be understood more clearly, it will be explained in greater detail below on the basis of the drawings.

BRIEF DESCRIPTION OF THE DRAWING

FIGS. 1 and 2 show partial views of a double main boom-double derrick boom arrangement;

FIG. 3 shows the crawler-type carriage with the superstructure;

FIG. 4 shows the combination bottom block;

DETAILED DESCRIPTION OF THE PREFERRED EMBODIMENTS

The inventive large crane is a lattice-boom crawler crane and operates according to the derrick crane principle; that is, the basic machine is designed without ballast as usual for this type of crane and supplies little or nothing to the stability moment of the crane.

Figure 7:
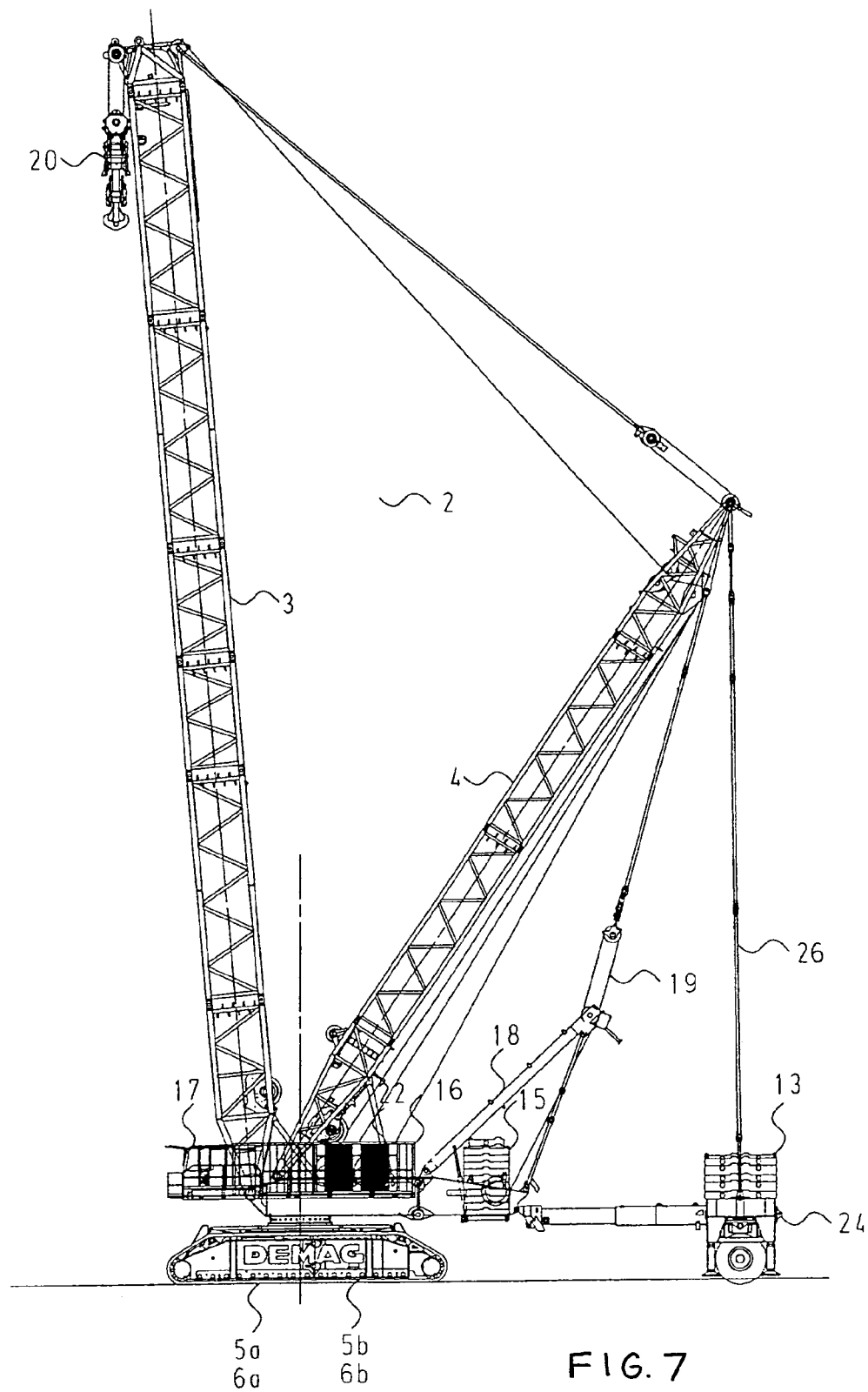
FIG. 7 shows a derrick crane according to the prior art.
Figure 8:
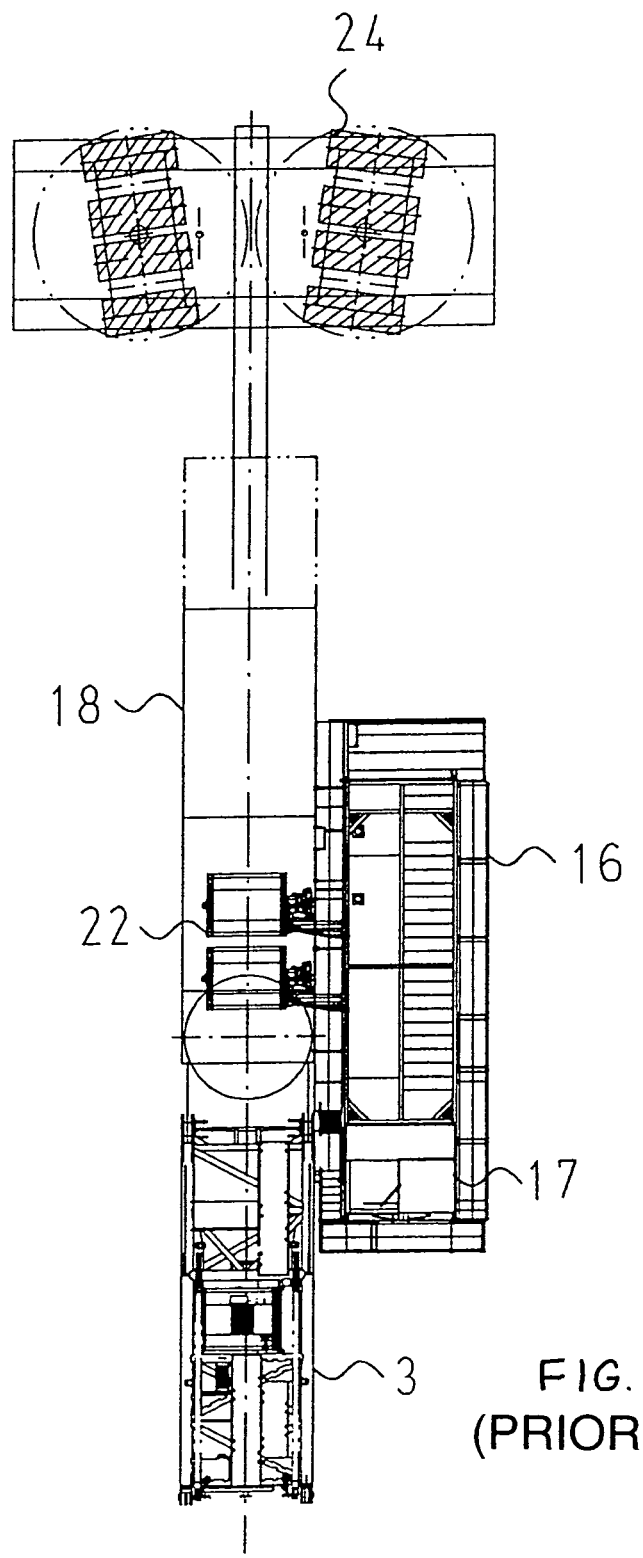
FIG. 8 shows a corresponding partial top view.
Figure 9:
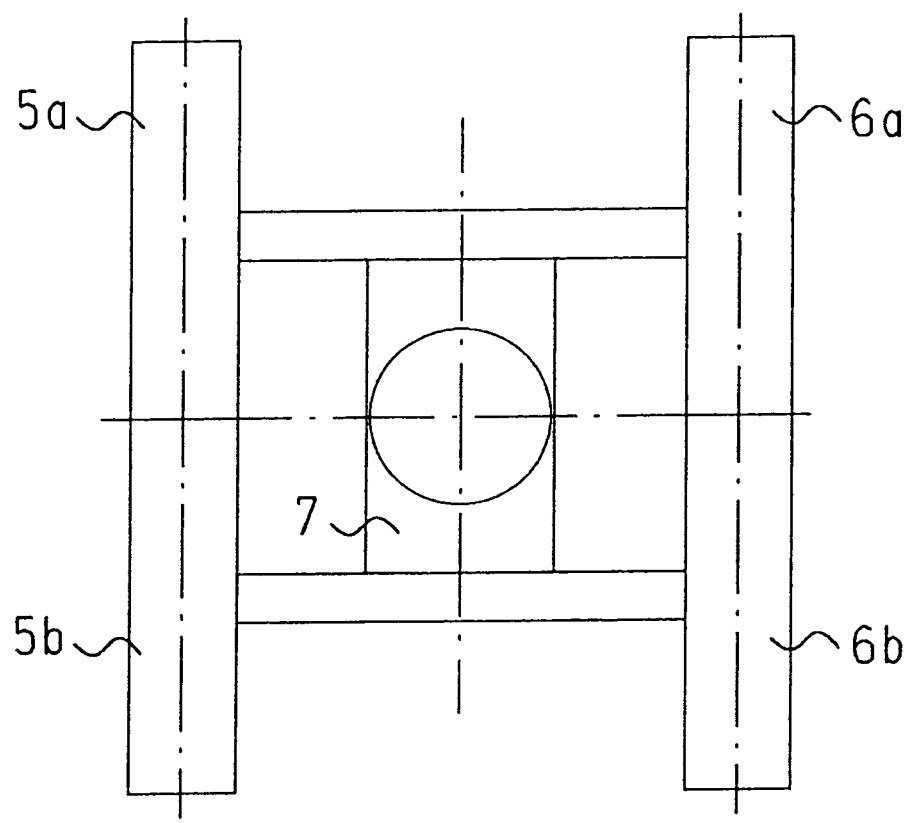
FIG. 9 shows a schematic diagram of the undercarriage according to the prior art.

FIGS. 7-9 show a derrick crane according to the prior art. In the following description, the reference numbers will also pertain to this known design, because the components essential to an understanding of the invention can also be seen here.

The mechanical basis for the inventive large crane is thus formed by components of existing standard production cranes and by the special parts which are necessary to expand the basic crane into a large crane.

Several components of the inventive large crane are designed as modular components.

In the following, ways in which the working load can be increased will be considered.

Referring to FIG. 2, two symmetrically arranged booms 3a, 3b are connected to each other by connecting elements 30 so that they are preferably rigid with respect to moments. The derrick booms (superlift masts 4a, 4b) shown in FIG. 1 and the combination bottom hook block 20a, 20b, 21 (FIGS. 4 and 10) are designed in the same way, but here they are free of moments.

Figure 5:
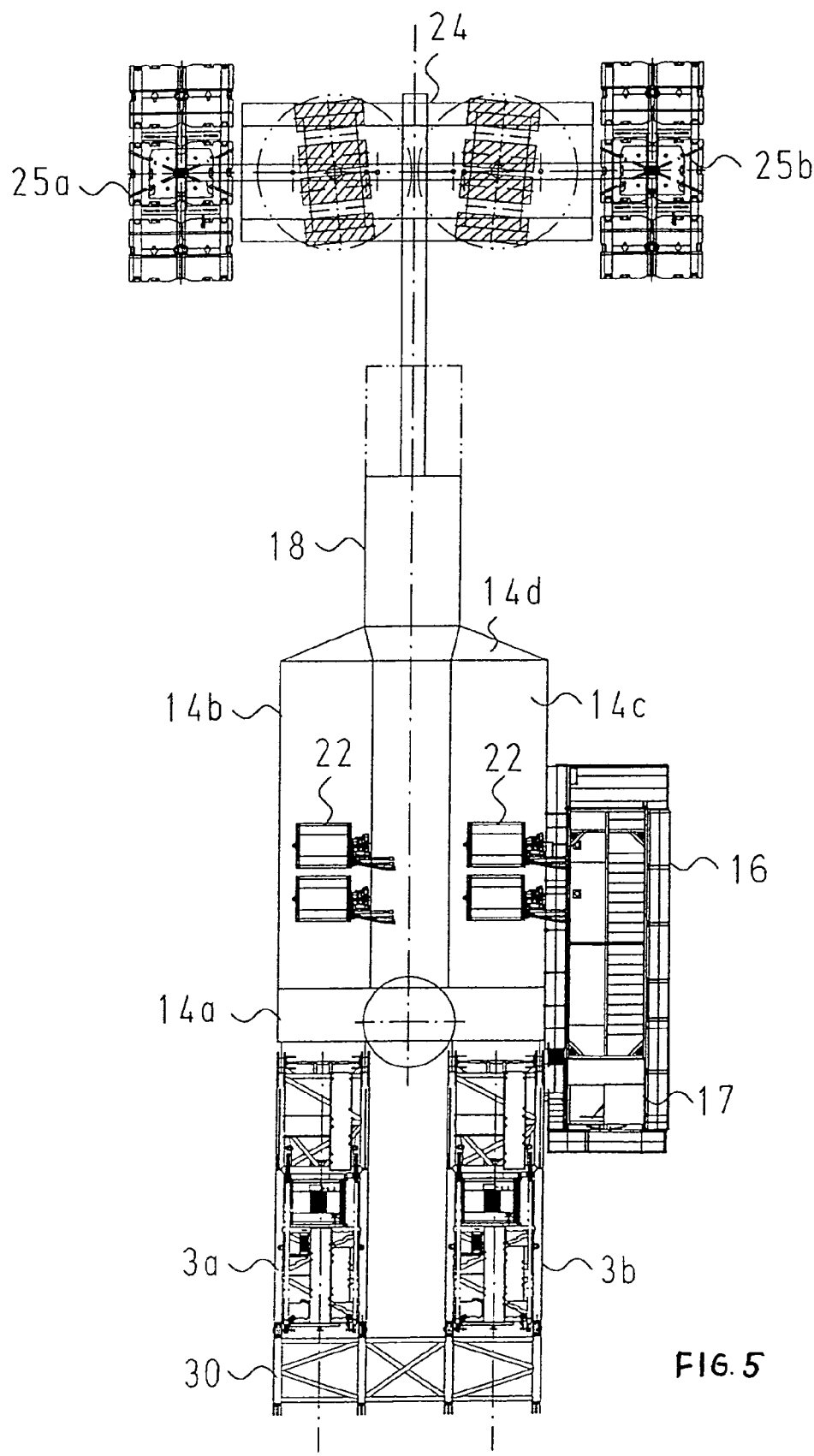
FIG. 5 shows a partial top view of the large crane.
Figure 10:
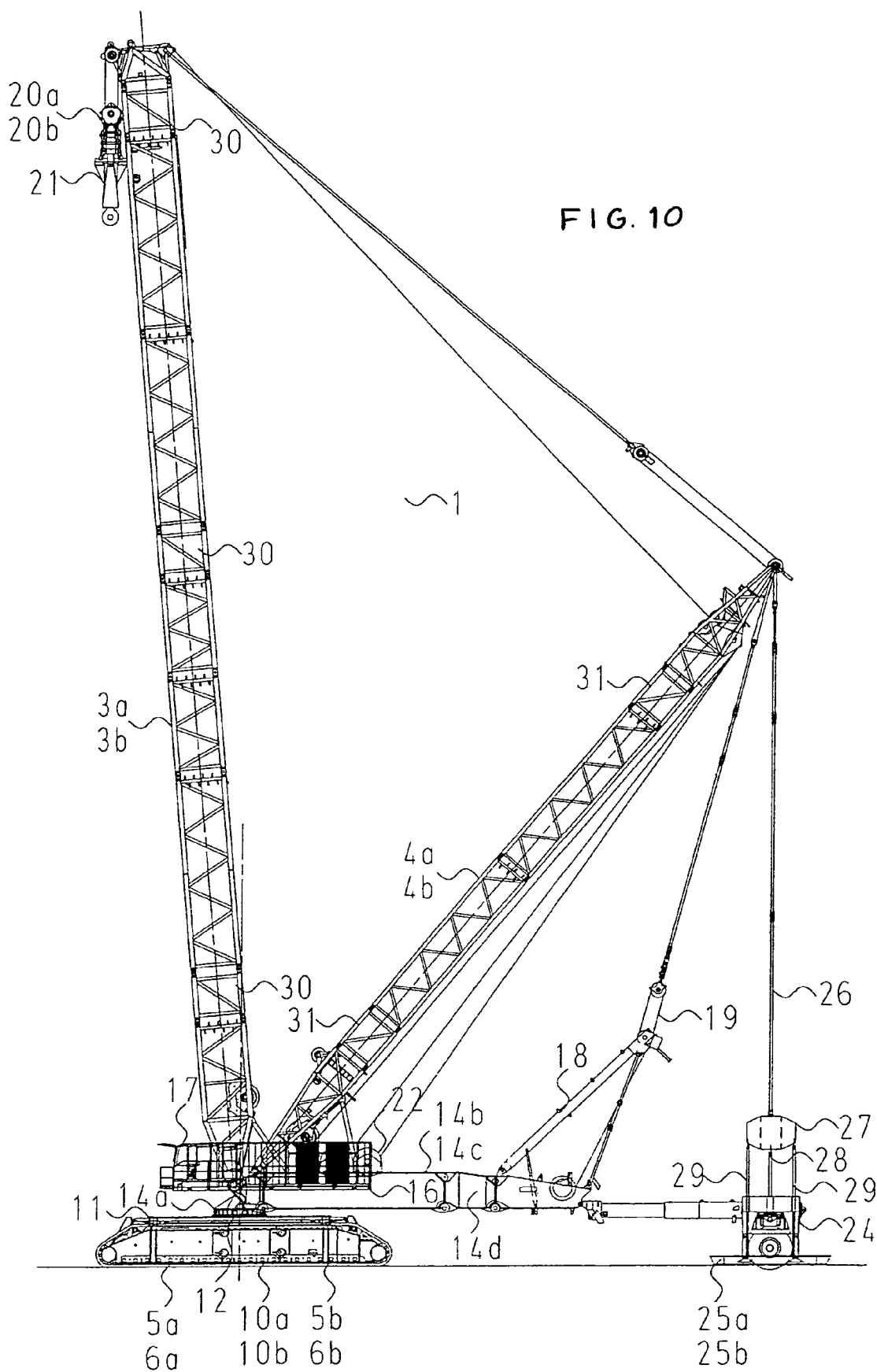
FIG. 10 shows a schematic diagram of the inventive derrick crane.

Referring to FIGS. 3, 5, and 10, a crane superstructure 14a, 14b, 14c, 14d of appropriately larger size and, according to the invention, made up of several components is used to support the boom components. The standard components used in the design of the crane include the drive unit 16, the control station 17, a superstructure component 18, and the lifting device 22, several of which are provided. The reeving of the luffing gear 19 is necessary only to erect the double mast, and therefore only one of them is sufficient.

The inventive combination of the booms makes it possible to lift loads which, in the case of short booms, are almost double that of the single version of the standard machine, and because of the greater lateral stability achieved with longer booms, the load can be double or even more than double that of a single standard machine.

Figure 6:
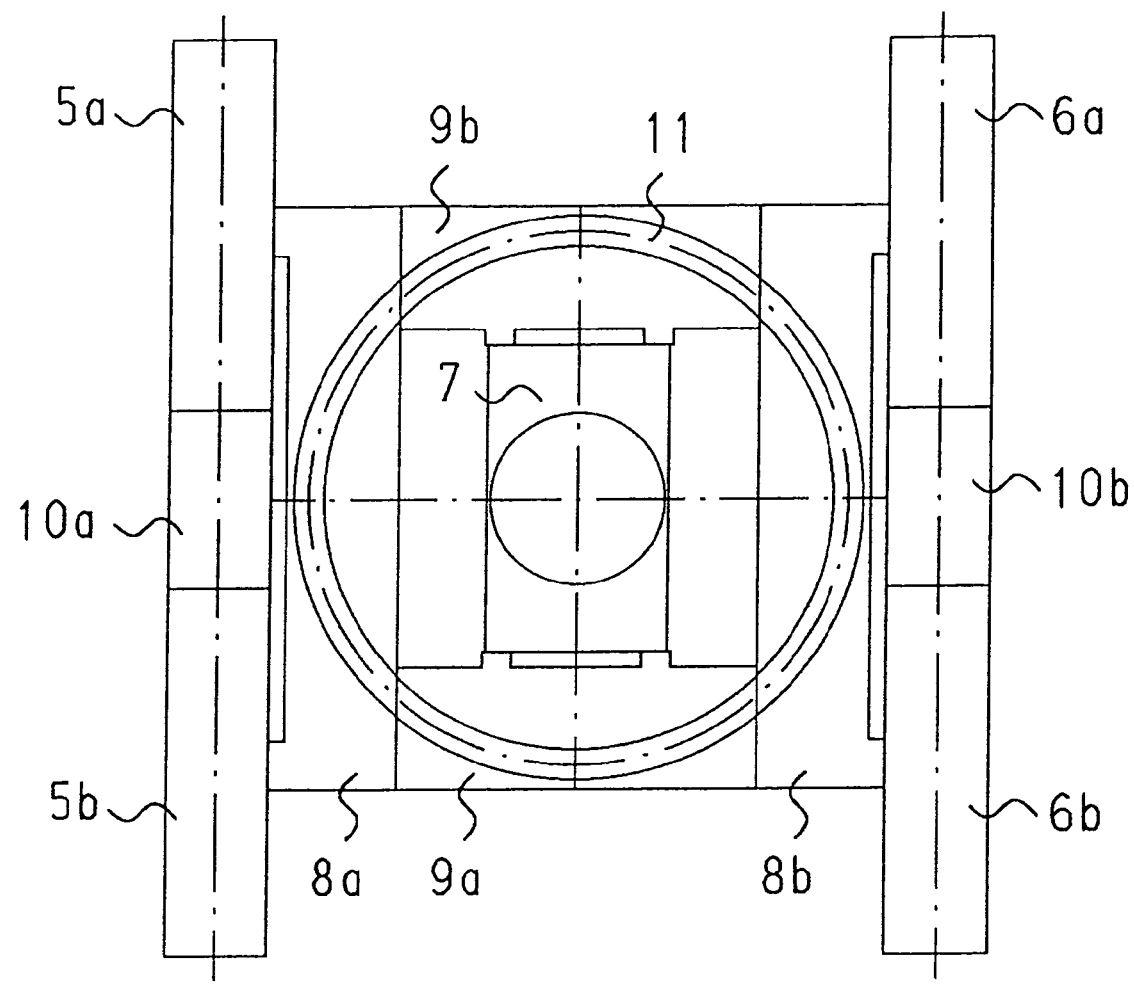
FIG. 6 shows a schematic diagram of the undercarriage.

The significantly increased working load capacity means that there is greater load on the crawler undercarriage, which therefore must be redesigned appropriately. Components of standard cranes in combination with expansion parts are used here again according to the invention: Referring to FIG. 6, the crawler carriers 5a, 5b and 6a, 6b, which are already of split design to reduce transport weight, are lengthened by the insertion of an intermediate piece 10a, 10b. The middle section 7 can continue to be used, and the distance between the tracks can be increased or decreased by the insertion or elimination of additional components 8a, 8b and 9a, 9b.

Heavier loads can be handled by mounting a circular track (11) on the undercarriage, on which support rollers (12) connected to the superstructure ride. Because there is little or no moment in the load direction, only the lateral load moment resulting from the lateral deformation and slanted position and the load need to be absorbed. As a result, a more uniform load distribution is produced than in standard commercial crawler cranes, and the crawler-type carriages originating from the smaller standard cranes can thus withstand the greater load. The above-mentioned circular track 11 can be an integral part of the necessary supplemental components (8a, 8b, 9a, 9b) or an independent load-bearing ring element, which is laid and fixed in place on the supplemental components (8a, 8b, 9a, 9b).

Because the basic machine does not contribute to the stability moment, a heavier counterweight 13 must be mounted on the mast so that heavy loads can be lifted. When the crane is turned or moved, this counterweight must be carried along also. For this purpose, either crawler carriers (as in the solutions designed by Lampson) or counterweight carriages on wheels have been used so far. In addition to the procedure predominantly used in engineering practice, namely, to build an appropriately larger counterweight carriage, there is also the possibility of using two counterweight carriages in a tandem combination. Both of these are complicated and expensive single-purpose solutions.

In the present case, a combination solution is used consisting of existing movable components and existing or custom-built stationary counterweight components. This separation is the object of the modular counterweight carriage disclosed in WO 2007/056970.

In the construction of new industrial facilities and especially in the modernization of old facilities by the addition of high-rise units, the feasibility of crane operation is determined predominantly by the time factor, by the available space, and by the other conditions present at the work site. The use of the inventive crane offers the following advantages:

(1) The crane can be assembled at any desired location, even in tight spaces, where it can lift the load from a different location, set it down at any desired other location, and after use can be disassembled in any desired location, because operationally it can travel, rotate the load, and luff like a standard lattice-boom crawler crane, either with or without load.

(2) Because of the ability to combine standard machine components in modular fashion with only a few expansion parts, several technical and commercial advantages are created for the customer:

(a) Achievement of the greatest possible working load capacities and radii at modest additional investment cost. Only the expansion parts required to convert a standard machine to a large machine must be kept available;

(b) More effective utilization of the basic investment, because crane work can still be carried out with the standard machines at their original capacities (when the large crane is not needed);

(c) Lower transport costs, because the components of standard cranes are usually smaller than those suitable for large cranes;

(d) Only the large crane expansion parts must be transported from a construction site where standard machines are being used to the next construction site, which means that large cranes of various capacities can be erected at various locations in a short time.

(e) Operationally relevant elements and processes known from standard cranes as well as maintenance and repair procedures can be retained almost without change.

(f) No special inventory of spare parts must be maintained; only standard spare parts.

What is claimed is:

1. Large mobile crane comprising an undercarriage, wherein the undercarriage comprises a middle section between tracks, wherein a distance between the tracks can be increased or decreased by the insertion or removal of expansion parts, said two tracks connected on opposite sides of the undercarriage to permit movement of the large mobile crane, a drive unit, a superstructure, one or more control stations, at least two main booms, at least one derrick boom, and at least two lifting devices and counterweights, wherein said counterweights are either arranged separately of or mounted on the undercarriage, and wherein the large mobile crane further comprises a circular track mounted on the undercarriage, and support rollers attached to the superstructure, wherein the support rollers ride on the circular track, and wherein the circular track is an independent load-bearing ring element being laid and fixed in place on the expansion parts.

2. Large mobile crane according to claim 1, wherein the at least two main booms are mounted symmetrically with respect to each other on the superstructure, the booms being connected to each other by connecting elements so that they are rigid with respect to moments.

3. Large mobile crane according to claim 1, wherein the counterweights are arranged both separately and on the undercarriage.

4. Large mobile crane according to claim 1, wherein the main booms are paired with derrick booms, which are connected to each other by connecting elements.

5. Large mobile crane according to claim 1, wherein the undercarriage is a crawler undercarriage and the two tracks are crawler tracks.

6. Large mobile crane according to claim 1, wherein the at least two main booms are arranged next to each other on the superstructure and are connected to each other so that they are rigid with respect to moments, and wherein the main booms are paired with at least two derrick booms.

7. Large mobile crane according to claim 1, wherein the undercarriage has crawler-type tracks arranged one behind the other or with an offset.

8. Large mobile crane according to claim 1, further comprising a pair of bottom hook blocks which are combined with each other by means of a connecting crosspiece.

9. Large mobile crane according to claim 1, further comprising retaining rollers mounted on the superstructure.

10. Large mobile crane according claim 1, wherein the whole circular track is completely arranged on the expansion parts.

11. Large mobile crane according claim 1, wherein the circular track surrounds the middle section, such that the circular track is spaced apart from the middle section.

\* \* \* \* \*